United States Patent [19]

Fortune et al.

[11] Patent Number: 5,085,360
[45] Date of Patent: Feb. 4, 1992

[54] SPARE TIRE MOUNTED BICYCLE RACK

[75] Inventors: Christopher S. Fortune, Verona; Ervin L. Severson, Oregon, both of Wis.

[73] Assignee: Graber Products, Inc., Madison, Wis.

[21] Appl. No.: 635,669

[22] Filed: Dec. 28, 1990

[51] Int. Cl.⁵ .............................................. B60P 3/363
[52] U.S. Cl. ............................... 224/42.13; 224/42.21; 224/42.26
[58] Field of Search ............ 224/42.13, 42.11, 42.03 B, 224/42.21, 42.25, 42.26

[56] References Cited

U.S. PATENT DOCUMENTS

| | | | |
|---|---|---|---|
| 4,513,897 | 4/1985 | Graber | 224/42.03 B X |
| 4,884,728 | 12/1989 | Temple | 224/42.13 |
| 4,976,386 | 12/1990 | Geiger | 224/42.03 B X |
| 5,007,567 | 4/1991 | Foster | 224/42.13 |

Primary Examiner—Renee S. Luebke
Attorney, Agent, or Firm—Fuller, Ryan & Hohenfeldt

[57] ABSTRACT

A bicycle carrier mounted on a vehicle spare tire mounted in a vertical plane. The carrier includes a rail positioned alongside the spare tire and a U-bolt positioned on the opposite side of the spare tire with the ends extending across the tire and extending through the rail to form a rectangular opening which receives the spare tire. An upright standard, affixed to the rail, extends upwardly to support a beam parallel with the rail. A pair of horizontal spring loaded arms pivot with respect to the beam between an operative position, wherein the arms are normal to the beam, and an inoperative position, where the arms overlie the beam. One of the arms is fitted with a double link pivoting in a vertical plane and having a free end for receiving a padlock when the link is pivoted to overlie the bicycle frame and straddle the arm. A padlock inserted through the link free end captures the bicycle frame between the arm and the link. The standard is adjustably positionable along the rail, and the beam is adjustably positionable with respect to the standard, to accommodate spare tires mounted offset from the center of the vehicle.

14 Claims, 2 Drawing Sheets

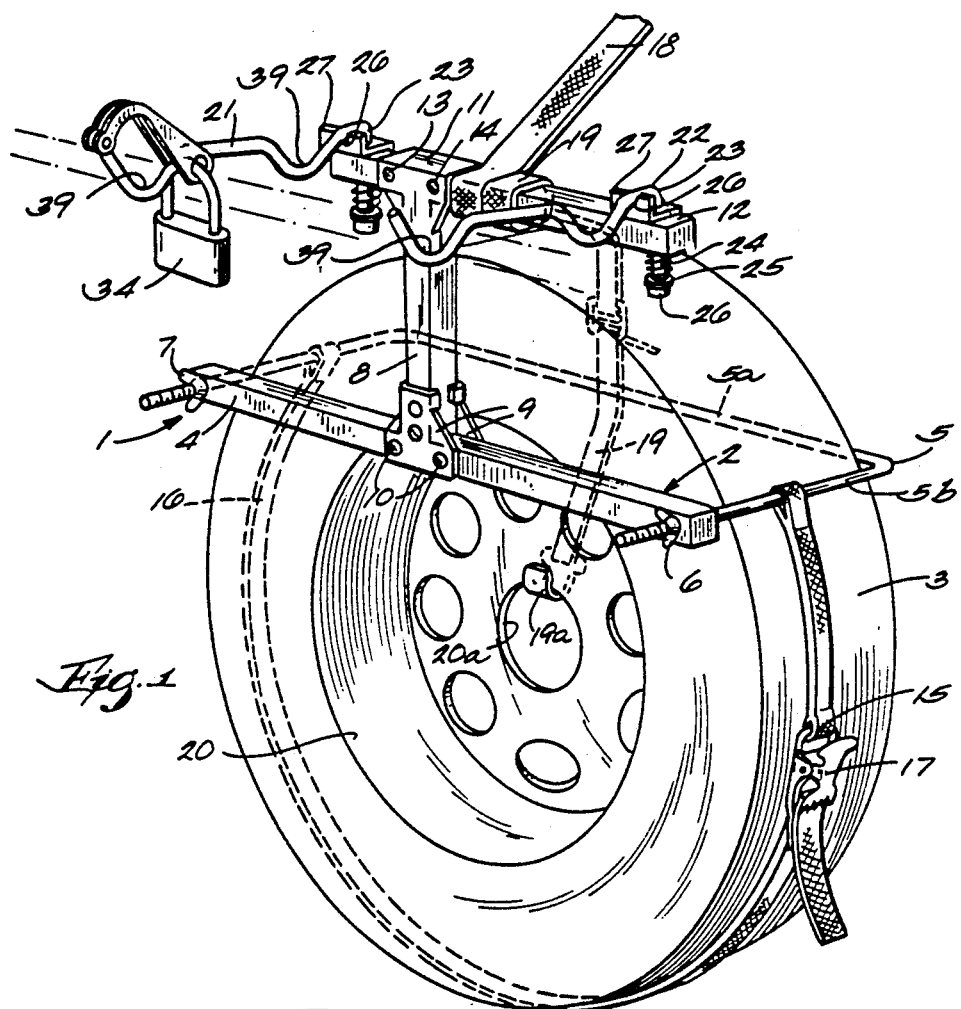

SPARE TIRE MOUNTED BICYCLE RACK

BACKGROUND OF THE INVENTION

This invention relates to a bicycle carrier, and more particularly to a bicycle rack mounted on a vehicle spare tire where the spare tire is in a vertical plane.

Since bicycles are awkward to carry and take considerable needed space when carried inside a motor vehicle, it is advantageous to carry the bicycle on the outside of the motor vehicle For security reasons, a provision for locking the bicycle on the vehicle is also advisable. A bicycle carrier should be conveniently and easily mounted so it can be quickly removed when it is not needed.

The patent to Traugh, U.S. Pat. No. 4,392,597, shows a bicycle rack supported on a spare tire and constructed of a plurality of rods fabricated to form an integral structure. A strap is fastened to the bicycle to support the bicycle in its carrying position. One embodiment of the rack of the Traugh patent is adjustable to fit different width spare tires. However, the adjustment components are not positively held together Rather, free sliding of the adjustment components is prevented only by conventional shock straps, which are prone to overstretching and fatigue-induced breakage Another disadvantage of the rack is that it is usable only on spare tires mounted in the middle of the back or front ends of a vehicle.

Another bicycle rack, manufactured by the 5th Wheel Company of San Clemente, Calif., utilizes the wheel lug holes of a rear mounted spare tire to mount the rack. The 5th Wheel Company rack is also limited to use on spare tires mounted in the middle of the vehicle.

A further disadvantage of prior spare tire mounted racks is that their bicycle supporting arms are fixed in place when the racks are mounted to spare tires. Consequently, the arms frequently are in the way when not needed and are potential safety hazards.

Thus, a need exists for improvements in vehicle mounted bicycle carrying racks.

SUMMARY OF THE INVENTION

It is an object of this invention to provide a bicycle rack supported on a spare tire of a recreational vehicle, a mobile home, or a van type vehicle in which the spare tire is normally carried in a vertical position on the outside of the motor vehicle Another object of this invention is to provide a bicycle carrier with a bicycle carried on two pivotal arms which are pivoted outwardly to an operative position to carry the bicycle and pivoted inwardly out of the way when the carrier is not in use.

It is a further object of this invention to provide a bicycle carrier with bicycle carrying arms having means for accepting a padlock to provide adequate security for the bicycle.

The objects of this invention are accomplished by using a rail which is positioned alongside the spare tire. A frame, such as formed by a U-bolt, is positioned on the opposite side of the spare tire with the ends extending across the width of the tire and extending through the rail to form a rectangular opening which receives the spare tire in a chordal relationship with the tire. An upright standard, affixed to the rail, extends upwardly to support a beam parallel with the rail. A pair of horizontal spring loaded arms pivot with respect to the beam between an operative position and an inoperative position. In the operative position, the arms are generally perpendicular to the beam and are located to support the bicycle frame. In the inoperative position, the arms generally overlie the beam. One of the arms is fitted with a double link pivoting in a vertical plane and having a free end for receiving a padlock. The link is pivotable to overlie the bicycle frame supported on the arm with the link free end straddling and extending below the arm. A padlock inserted through the link free end captures the bicycle frame between the arm and the link.

A strap connected to each leg of the frame encircles the spare tire and firmly seats the rack on the spare tire. A second strap extends from the beam across the spare tire to fasten to the wheel hub. A third strap fastens the bicycle rack to the motor vehicle body.

Further in accordance with the present invention, the bicycle rack may be used on vehicles that mount their spare tires offset from the vehicle center line. For that purpose, the bicycle rack is provided with horizontal adjustments. That is, the upstanding standard can be adjustably positioned along the rail, and the beam can be adjustably positionable along the standard In this manner the carrier is adjusted so that the bicycle being carried does not extend beyond the vehicle sides regardless of the location of the spare tire on the vehicle.

Other objects, aims, and advantages of the invention will become apparent to those skilled in the art upon reading the disclosure.

DESCRIPTION OF THE DRAWINGS

FIG. 1 is a perspective view of a bicycle carrier constructed according to a preferred embodiment of the invention and mounted on a spare tire.

FIG. 2 is an side view of the carrier shown in FIG. 1, showing a bicycle mounted on the carrier.

DESCRIPTION OF A PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 3:
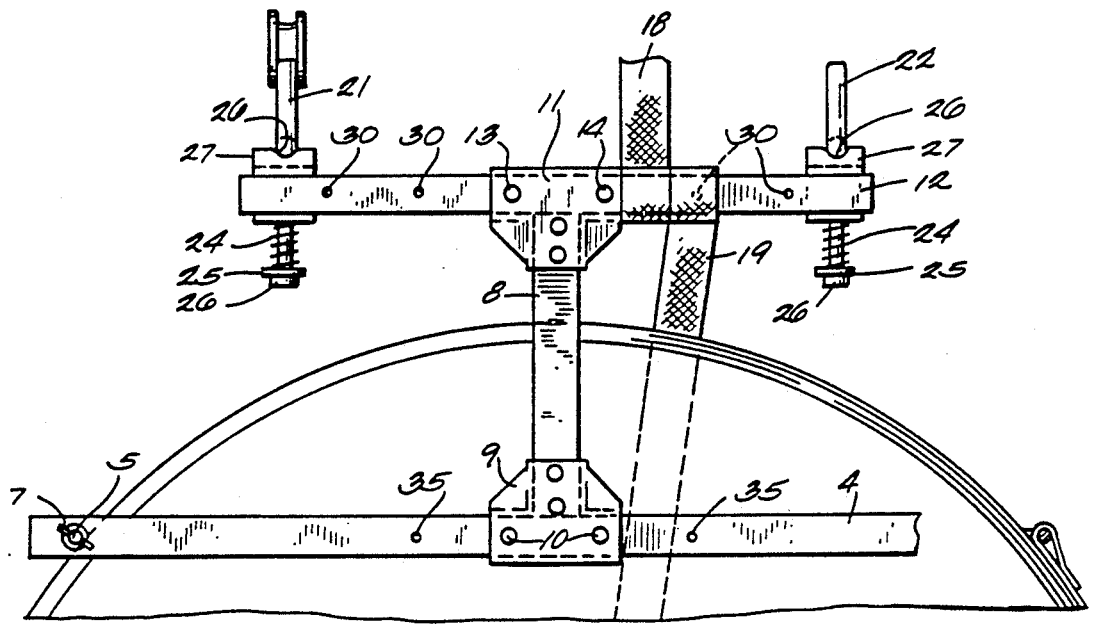
FIG. 3 is a side view, on an enlarged scale, of the bicycle carrier shown in FIG. 1, showing the positioning of the carrier on the spare tire.

Referring now to FIGS. 1 through 3, there is shown a carrier 1 including a rack 2 and straps for fastening the rack on a spare tire 3. The rack 2 is formed of a rail 4, positioned along the side of the spare tire 3, and a frame 5, such as a U-bolt, connected to the rail. The frame 5 includes a bight portion 5a positioned on the opposite side of the spare tire 3 and legs 5b and 5c extending over a portion of the spare tire at each end of the bight. Each leg 5b, 5c has a threaded end to fasten to the rail 4 by means of threaded fasteners such as wing nuts 6 and 7. The rail 4 supports an upright standard 8 which is slidably mounted to the rail and can be adjustably positioned along the rail and fastened in the chosen position by means of a bracket 9 and bolts 10. The upper end of the standard 8 has a fastening bracket 11, to which is slidably mounted a beam 12. The position of the beam 12 is adjusted by sliding the beam to the desired position with respect to the bracket 11, and fastening the beam in that position by bolts 13 and 14.

A first tire strap 15 is connected to one of the legs 5b of the frame 5, and another tire strap 16 is fastened to the opposite leg 5c. The tire straps 15 and 16 are connected together via a buckle 17 to firmly seat the rack 2 on the spare tire 3. A body strap 18 is fastened to the beam 12 and connected to the vehicle body to firmly hold the rack 2 in its operating position.

A wheel strap 19 is connected to the beam 12 to secure the carrier 1 to the wheel 20. The wheel strap 19 extends across the tire 3 and downwardly to connect to a suitable wheel opening 20a by means of a hook 19a. The wheel strap 19 thus pulls downwardly on the carrier 1 in its operating position.

Arms 21 and 22 are pivotally mounted on the beam 12, generally one at each end thereof, by means of vertical ends 23 of the arms extending downwardly through openings in the beam 12 provided for that purpose. After extending through the beam 12, the vertical end 23 of each arm 21, 22 extends through a spring 24 and a washer 25, and is threaded into a nut 26. The spring 24 thus downwardly biases the arms 21, 22. In its normal operative position each arm 21, 22 projects outwardly away from, and substantially normal to, the beam 12. An upstanding flange 27 is provided at each end of the beam 12, and includes a slot 26. Each slot 26 is positioned so that the arm 21, 22 seats in the slot when in its operative position. When each arm 21, 22 is pivoted to its inoperative position, as shown in phantom in FIG. 5, it is over the beam and substantially parallel thereto, so that it is not extended outwardly from the vehicle.

FIG. 2 shows a bicycle B mounted on the carrier 2. The bicycle is seated with the top bar 29 of the bicycle frame 28 carried on the arms 21 and 22, and particularly in a seat 39 formed in each arm. The adjustable positioning of the upright standard 8 carrying the bracket 11 on bolts 13 and 14 is shown by arrows A.

In FIG. 3, additional openings 30 are shown on the beam 12 to accommodate bolts 13 and 14 when the beam is adjusted to different positions with respect to the upright standard 8. Similarly, additional openings 35 are shown on the rail 4 to accommodate bolts 10 when the upright standard 8 is moved to different positions with respect to the rail.

Figure 4:
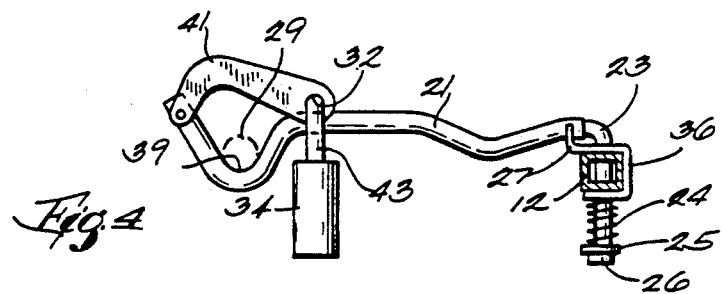
FIG. 4 is a side view of the support arm of the carrier pivoted to the operative position with the locking arm having a padlock installed thereon
Figure 5:
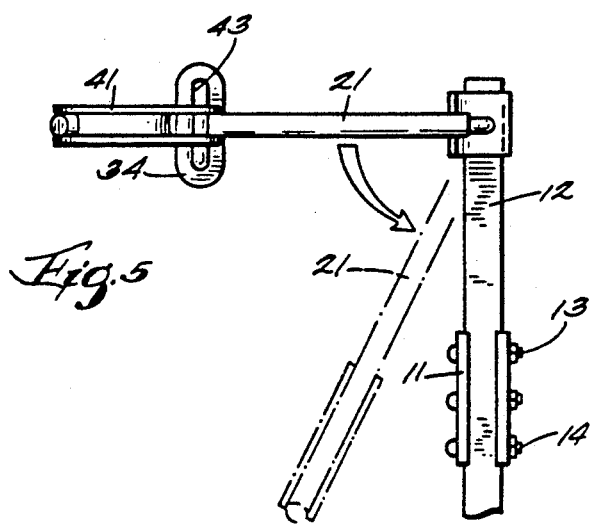
FIG. 5 is a top view of the support arm in the operative position, and in phantom showing the support arm pivoted toward the inoperative position.

Referring now to FIGS. 4 and 5, one end of a link 41 is pivotally supported on the end of the arm 21 opposite vertical end 23, and swingable in a vertical plane. Preferably the link 41 is a double link, so that when it is pivoted toward the arm 21 it straddles the arm. Link 41 has an opening 32 at its free end to receive the padlock locking member 43 of the padlock 34. As indicated above, the arm 21 is swingable about its vertical end 23 to an inoperative position, shown in phantom, in which it is immediately over the beam 12.

The operation and use of the carrier 1 will now be described as follows. The rail 4 and the frame 5 are fastened together by means of the nuts 6 and 7 to form the rack 2, which is then placed on the spare tire 3. The straps 15 and 16 are connected to place tension on the frame 5 as they encircle the spare tire 3 and firmly seat the rack 2 on the spare tire. The beam 12 on the upright standard 8 carries the two arms 21 and 22. The arms 21, 22 are positioned to extend from the rack as shown in FIG. 1, and the bicycle B can be seated on the seat 39 of arm 22 and seat 39 of arm 21. The link 41 is pivoted over the bar 29 of the bicycle frame and locked with the padlock 34.

To remove the carrier 1 from the vehicle, the bicycle B is first removed by unlocking the pad-lock 34 and lifting the bicycle from the seats 39. The straps 18, 19 and 16 and 15 are then loosened and the carrier 2 can readily be removed.

The embodiments of the invention in which an exclusive property or privilege is claimed are defined as follows.

We claim:

1. A bicycle carrier comprising:
    a rack with an opening adapted to receive and embrace an upper portion of a spare tire,
    strap means fastened to the rack to secure the rack to the tire,
    an upright standard mounted on said rack,
    means for securing a beam to said standard to maintain said beam in a laterally extending direction with respect to a vehicle carrying the spare tire, and
    means on said beam for securing a bicycle frame to said beam.

2. A bicycle carrier in accordance with claim 1 wherein the upright standard is adjustable along the rack to thereby enable the bicycle to be offset from the spare tire.

3. A bicycle carrier in accordance with claim 1 in which the means for securing the bicycle frame to said beam comprise support arms which are pivotally supported on said beam and movable between operative extended support positions and inoperative retracted positions.

4. A bicycle carrier in accordance with claim 3 wherein the means for securing a bicycle frame to said beam include:
    a locking link which is pivotally connected to the end of a support arm and swingably positionable over a seat portion on the arm, and
    apertures to accommodate a lock to secure the link in locked condition embracing a portion of the bicycle frame.

5. A bicycle carrier in accordance with claim 1 wherein said rack includes a rail and a frame with threaded ends which interfit in the rail and are secured to the rail with nuts on said threaded ends to grip the tire between the frame and rail.

6. A bicycle rack in accordance with claim 5 wherein the beam is adjustable within the beam securing means in a direction generally parallel to the rail to thereby enable the bicycle to be offset from the spare tire.

7. A bicycle carrier as set forth in claim 5 wherein said frame is in the form of a U-bolt.

8. A bicycle carrier for mounting on a motor vehicle comprising:
    a rack including a rail, a U-bolt fastened to the ends of said rail to form an opening adapted for receiving a portion of a spare tire connected to the motor vehicle, and a fastener connected to both ends of said U-bolt to firmly seat said rail and U-bolt on the spare tire;
    an upright standard mounted on said rail;
    a beam on the upper end of said standard substantially parallel with said rail;

fastening means connected to said beam for fastening said rack to said vehicle;

an arm pivotally mounted on each end of said beam on opposing sides of said standard;

means defining a recessed seat on each of said arms for carrying a bicycle;

a link pivotally mounted on at least one of said arms adapted for receiving a padlock for locking a bicycle carried in the arm seat 9. A bicycle carrier for mounting on a motor vehicle as set forth in claim 8 wherein the means for fastening the rack include straps for connecting to the spare tire and to the motor vehicle.

10. A bicycle carrier as set forth in claim 8 including longitudinal adjustment means for selective and alternative positioning of said beam relative to said rail.

11. A bicycle carrier as set forth in claim 8 including brackets on said rail and brackets on said beam for providing longitudinal adjustment on said rack.

12. A bicycle carrier for mounting on a motor vehicle comprising:

a frame defining a generally elongated opening adapted for placement in a chordal position on a spare tire attached to the motor vehicle, a fastener for firmly seating the frame on the spare tire, an upright standard mounted with respect to said frame, a beam supported on the upper end of said standard lying in a plane parallel with the spare a pivotal arm on each end of said beam positionable in an inoperative position parallel to said beam and in an operative position normal to said beam, means defining a seat on each of said arms for carrying a bicycle, and link means pivotally connected to at least one of said arms pivotable to a locking position for locking a bicycle carried in the arm seat.

13. A bicycle carrier for mounting on a vehicle as set forth in claim 12 wherein the fastener is a strap wrapping around the spare tire.

14. A bicycle carrier as set forth in claim 12 including a spring and a flange cooperating to hold each arm in the operative position and to hold each arm in the inoperative position.

* * * * *